United States Patent [19]

Beck et al.

[11] Patent Number: 4,633,349
[45] Date of Patent: Dec. 30, 1986

[54] DISK DRIVE AIR FILTER ASSEMBLY

[75] Inventors: John L. Beck, Byron; Daniel L. Good; Daniel R. Stacer, both of Rochester, all of Minn.

[73] Assignee: International Business Machines Corporation, Armonk, N.Y.

[21] Appl. No.: 633,752

[22] Filed: Jul. 23, 1984

[51] Int. Cl.$^4$ .................. G11B 17/02; G11B 17/32; B01D 39/08; B01D 50/00
[52] U.S. Cl. ........................................ 360/97; 360/98; 55/484; 55/501
[58] Field of Search ...................... 360/97–99; 55/484, 501

[56] References Cited

U.S. PATENT DOCUMENTS

| | | | |
|---|---|---|---|
| 4,054,931 | 10/1977 | Bolton et al. | 360/97 |
| 4,329,722 | 5/1982 | West | 360/98 |
| 4,410,341 | 10/1983 | Edwards et al. | 360/98 |
| 4,538,192 | 8/1985 | White et al. | 360/98 |

Primary Examiner—Robert S. Tupper
Attorney, Agent, or Firm—Robert W. Lahtinen

[57] ABSTRACT

A cartridge filter for an enclosed magnetic disk drive is disclosed which includes a dual media drum type filter element in a recirculating filter assembly that surrounds the breather filter and delivers air from the periphery of the disk stack to the axial entry of the ventilated disk spindle assembly. The cartridge provides an extended media surface within a compact space for frequent cycling of the enclosed air volume through the filter.

6 Claims, 3 Drawing Figures

4,633,349

DISK DRIVE AIR FILTER ASSEMBLY

FIELD OF THE INVENTION

This invention pertains to disk drive air filtration systems and more particularly to a cartridge type filter system that offers an extended filter media surface, compact design and minimal flow restriction.

BACKGROUND OF THE INVENTION

In present magnetic storage media disk drives, magnetic media coating thicknesses and transducer fly heights are becoming progressively smaller as recording densities increase. Thus maintaining the enclosure, which houses the transducers and rotating media, free of particulate contamination becomes correspondingly more critical and the size particle that can be tolerated is much smaller. Of special concern are particles that might be generated having magnetic properties, since higher storage densities mean smaller magnetic domains exist on the recording surface, while most actuators for moving the head assembly contain strong permanent magnets.

It has become the practice to use an enclosure for the head-disk assembly that is sealed except for a breather that accommodates pressure differentials occasioned by conditions such as temperature change or atmospheric pressure variations. The filter system, to be effective, must quickly pick up particulate matter and effectively purge the entire working volume of the head-disk enclosure with frequent air changes. Disk drive assemblies, to be commercially competitive, must also meet a form factor limiting the overall dimensions.

There are, accordingly, conflicting objectives. Frequent air changes call for extended filter surfaces and large air flow paths to minimize resistance to circulation while not extending the physical dimensions of the drive. This is made more severe when an attempt is made to design half high drives that are only half the height of the normal form factor so that two drives can occupy the same space formerly occupied by a single drive.

SUMMARY OF THE INVENTION

The apparatus of the present invention shows the use of a cartridge type recirculating air filter assembly that has a drum type filter media carrying support member which presents axially spaced filter media within a plenum. The assembly is formed as a cartridge having an open side with such plenum chamber being completed by the enclosure cover upper wall as the cartridge is attached to such enclosure cover through an opening that is coaxial with rotatable disk assembly. This opening is above the disk spindle, concentrically within the recirculating filter system and covered by a breather filter media. The breather filter is thereby located at the subambiant location in the air flow path to more effectively assure that any air leakage through seals or bearings is outward from the enclosure rather than into the enclosure.

DETAILED DESCRIPTION

Figure 1:
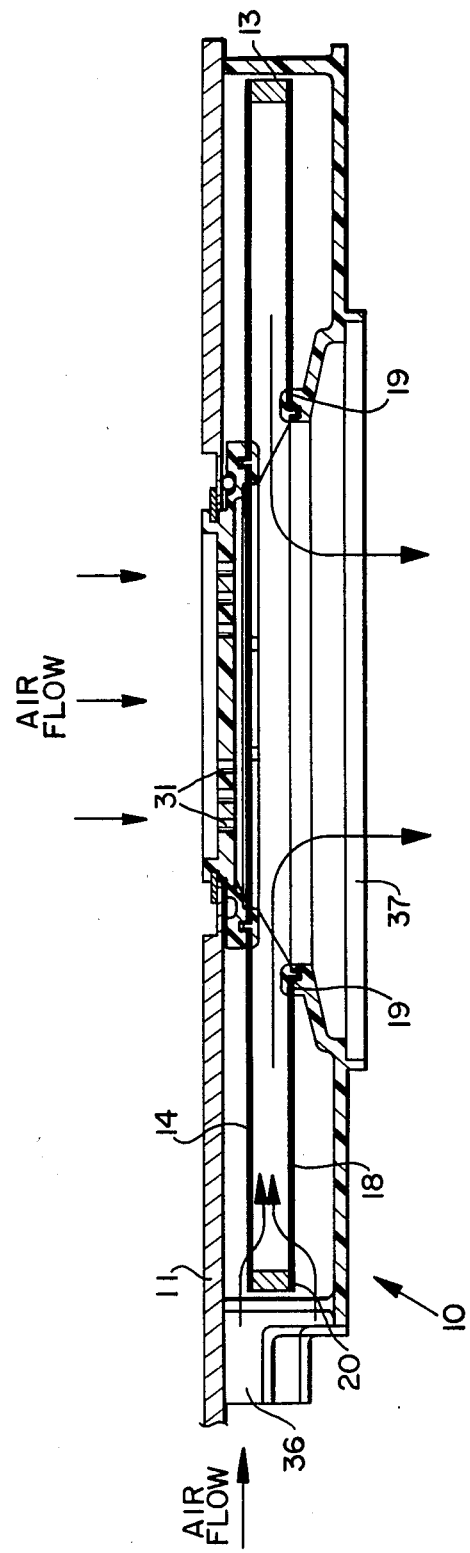
FIG. 1 shows an axial section of the disk file air filter cartridge of the present invention including the cooperating portion of the head disk assembly cover.
Figure 2:
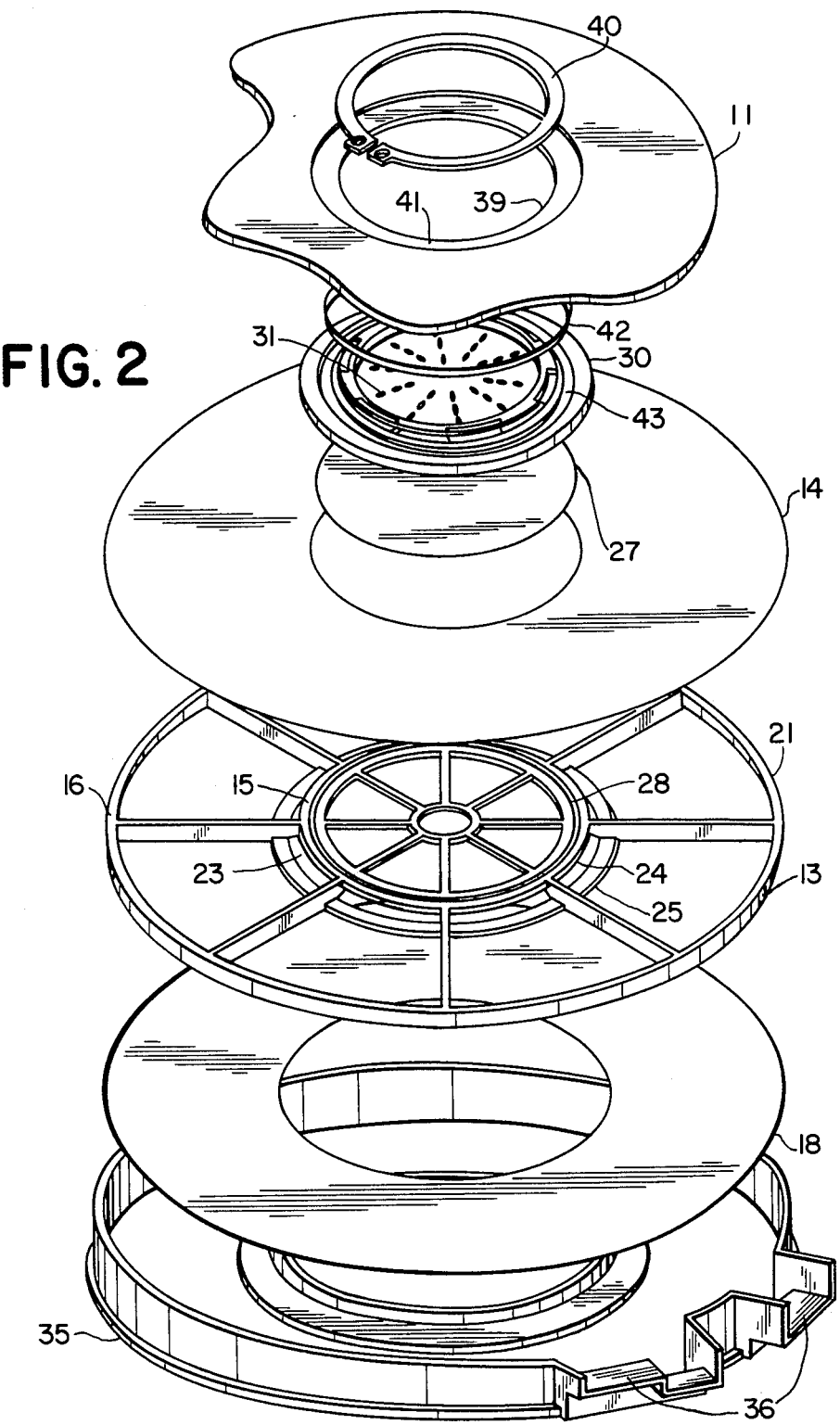
FIG. 2 is an exploded view of the cartridge assembly of FIG. 1.

Referring to FIGS. 1 and 2, the air filter cartridge 10 is clamped to the disk file cover 11 to form the completed assembly. A webbed wheel 13 has an upper recirculating media 14 which is bonded to the inner, radially extending surface 15 and the outer radially extending annular surface 16. The lower recirculating media 18 is adhered along the inner and outer margins thereof to the lower axially facing and radially extending surface 19 of webbed wheel annulus 21 and the axially facing surface 20 of annulus 21 opposite surface 16 respectively. The space between the recirculating filter media 14 and 18 communicates through the openings 23 between annulus 24 and annulus 25. The bonding between filter media 14 and 18 and the webbed wheel 13 can be effected using adhesive or by ultrasonic bonding. A breather filter media 27 is continuously secured to the webbed wheel annulus portion 24 radially within the circular axially projecting flange 28. A breather plate 30 is secured to webbed wheel 13 annulus surface 15 with the inner margin of the top recirculating filter 14 and the outer margin of breather filter 27 therebetween. The breather plate 30 has a series of openings 31 therethrough. The plenum member 35 is secured to the lower axially facing surface of webbed wheel annulus 25 along the surface 19. In the assembled condition, plenum 35 is retained against and cooperates with disk file cover 11 to provide a duct or passageway from the openings 36 formed in the periphery to the circular outlet defined by the circular wall surface 37. In passing from the opening to the outlet, the air must pass through the upper or lower recirculating media.

The cartridge assembly 10 is secured to the cover 11 through a round opening 39 by a retaining ring 40 which resides in a recessed annulus 41 formed in the cover surrounding opening 39. To effect a seal between cover 11 and the cartridge assembly 10, an O-ring seal 42 is positioned in the breather plate groove 43 and compressively retained against the cover 11. Thus any air entering or leaving the enclosed volume through the cover must pass through the breather filter media 27.

Figure 3:
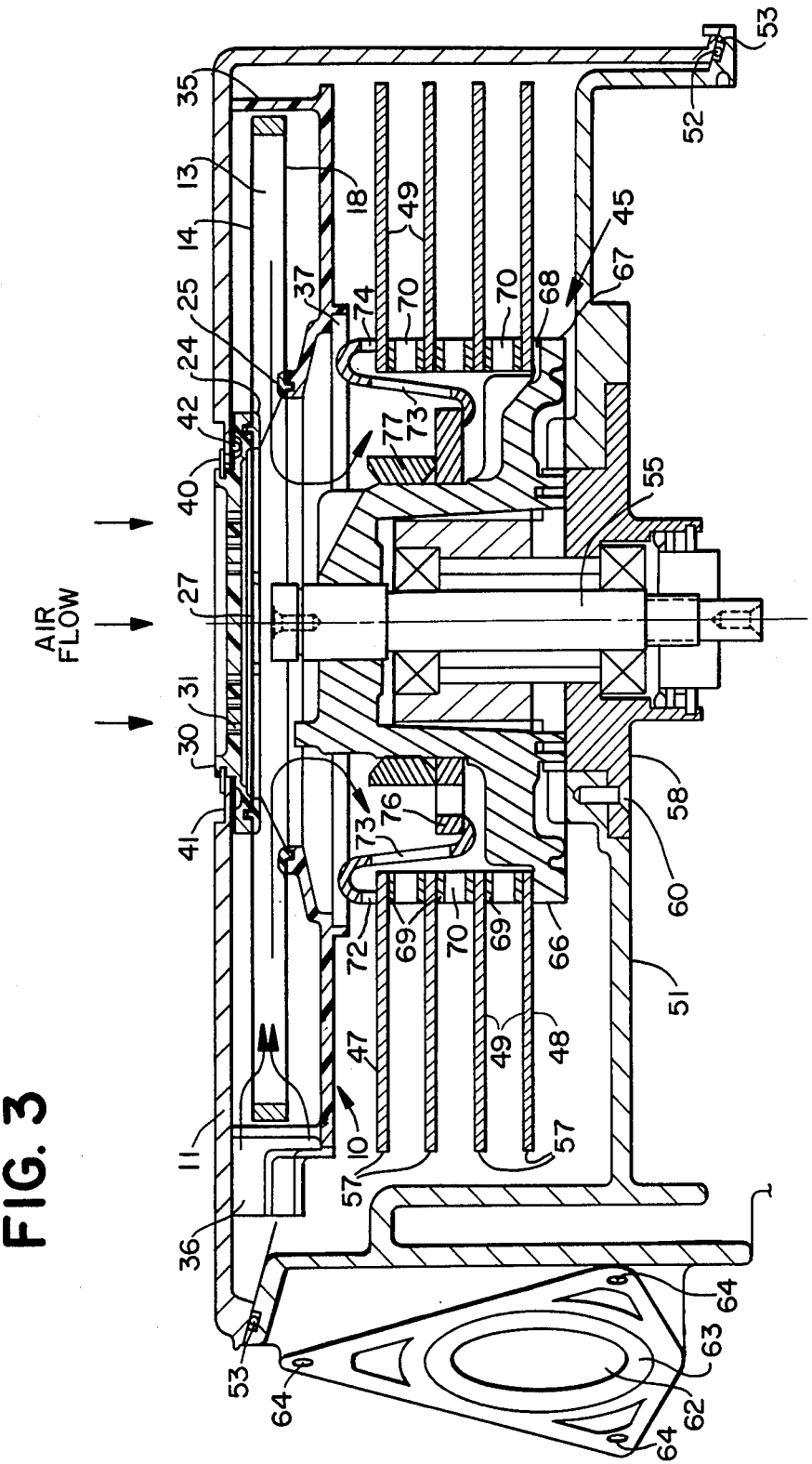
FIG. 3 is a section view of a typical disk file head disk assembly including the air filter cartridge of FIG. 1 and the cooperating hub-disk assembly.

As seen in FIG. 3, the cartridge 10 mounted on the disk file cover 11 cooperates with a disk-spindle assembly 45 to provide a recirculating air flow path. The air flow path is through cartridge 10 from inlet openings 36 to the outlet defined by the surface 37 where it enters the ventilated disk-hub assembly 45, which induces the air flow by rotation and passes through the ventilated hub, radially over the disk surfaces 47, 48, 49 and returns to the cartridge inlet opening 36.

The file includes a base member 51 against which the cover 11 is retained and sealed by an O-ring 52 disposed in the channel 53. The spindle 55, which carries the rotating disks 57, is mounted on a bearing tower 58 by ball bearings and the bearing tower is secured to base 51 by a series of bolts 60 (one of which is shown). The base 51 also has an opening 62 through which an actuator for carrying transducer heads is mounted and secured by bolts which are received in the threaded openings 64. The disk-spindle assembly 45 includes a hub 66 mounted on spindle 55. The hub 66 has a series of projections 67 presenting upper surfaces that define a radial plane of support for the disk stack while providing intervening openings 68 that permit air from the ventilated center of the hub 45 to exit radially over the lowermost disk surface 48. The disks 57 are separated by spacers 69 with apertures 70 therethrough. The clamping bell 71 has a series of downwardly extending projections 72 that terminate in end surfaces defining a radial plane for clamping the disk stack while the spaces 74 between the projections afford peripherally arranged openings enabling air flow radially across the upper disk surface 47 from the interior of the spindle assembly. Clamping bell 71 also includes openings 73 to complete the air flow path from the filter cartridge outlet defined by surface 37, through the ventilated spindle assembly and through the various openings 68, 70, 74 that permit the filtered air to radially purge each of the disk surfaces 47, 48 49. The clamping force retaining the disk stack is provided by a ring 76 which is received about hub 66 and compressively retained by a heat shrink ring 77 mounted about hub 66 while heated and expanded and thereafter cooled to create an interference fit which retains clamping bell 71 and the disk stack with a predetermined compression force.

While the invention has been particularly shown and described with reference to a preferred embodiment, it will be understood by those skilled in the art that various changes may be made in form and details without departing from the spirit and scope of the invention.

What is claimed is:

1. A recirculating air filter assembly for a disk drive which includes frame and cover elements for enclosing the transducer head positioning actuator and rotating disk assemblies comprising:

a support member including an annular wall;

a pair of spaced substantially parallel recirculating filter media supported on and extending radially inwardly from opposite axial ends of said support member annular wall;

plenum wall portions at each side of, spaced from and surrounding said support member and said pair of annular filter media forming a plenum chamber;

inlet opening means in said plenum wall portions beyond the periphery of said support member to admit air to said plenum; and central outlet means adjacent an axial end of the disk assembly, said outlet extending through a plenum wall and communicating with the space defined by the support member annular wall and said filter media and isolated from the plenum chamber portion communicating with said inlet means.

2. The recirculating air filter assembly of claim 1 wherein said support member is formed as a single part including said annular wall, a pair of axially spaced annuluses, each presenting a radial surface and a series of spoke elements extending radially between said annular wall and said pair of axially spaced annuluses.

3. The recirculating air filter assembly of claim 2 wherein the inner diameter of one said annulus defines said central outlet means and a generally circular breather filter media is attached at the margin thereof to the other annulus to be positioned radially inwardly of said recirculating filter media attached to the same annulus radial surface.

4. The recirculating air filter assembly of claim 3 wherein said cover includes an opening coaxial with the disk assembly and said filter assembly has a portion extending through said cover opening with said filter assembly secured to said cover at said opening.

5. The recirculating air filter assembly of claim 4 wherein said disk drive cover provides a wall portion of said plenum.

6. The recirculating air filter assembly of claim 5 wherein said inlet opening means is in the radial direction adjacent the actuator transducer positioning within the enclosure formed by said frame and cover elements.

* * * * *